Aug. 24, 1943.  R. HUFFORD  2,327,599
ON-CENTER VALVE VACUUM GOVERNOR AND SPARK CONTROL
Filed June 28, 1941  3 Sheets-Sheet 1

INVENTOR.
RAYMOND HUFFORD,
BY Lockwood, Goldsmith & Galt
ATTORNEYS

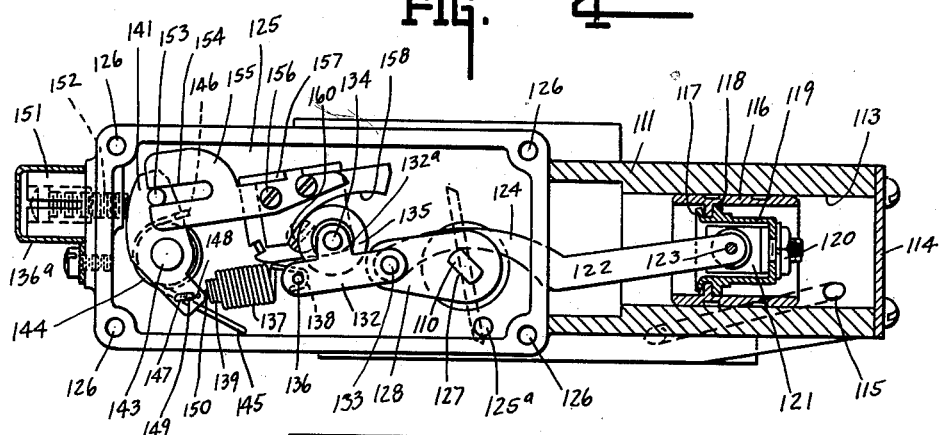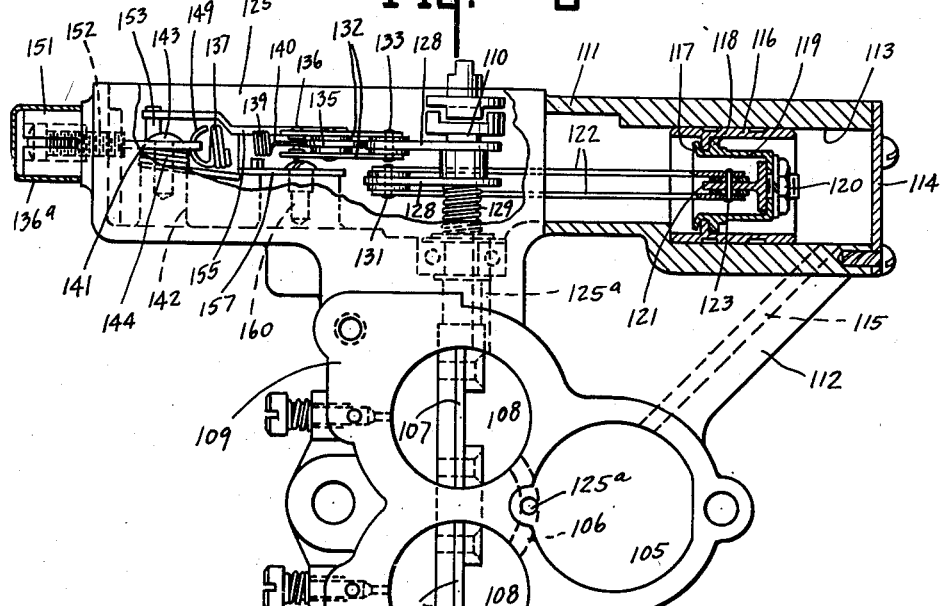

Aug. 24, 1943.  R. HUFFORD  2,327,599
ON-CENTER VALVE VACUUM GOVERNOR AND SPARK CONTROL
Filed June 28, 1941   3 Sheets-Sheet 3
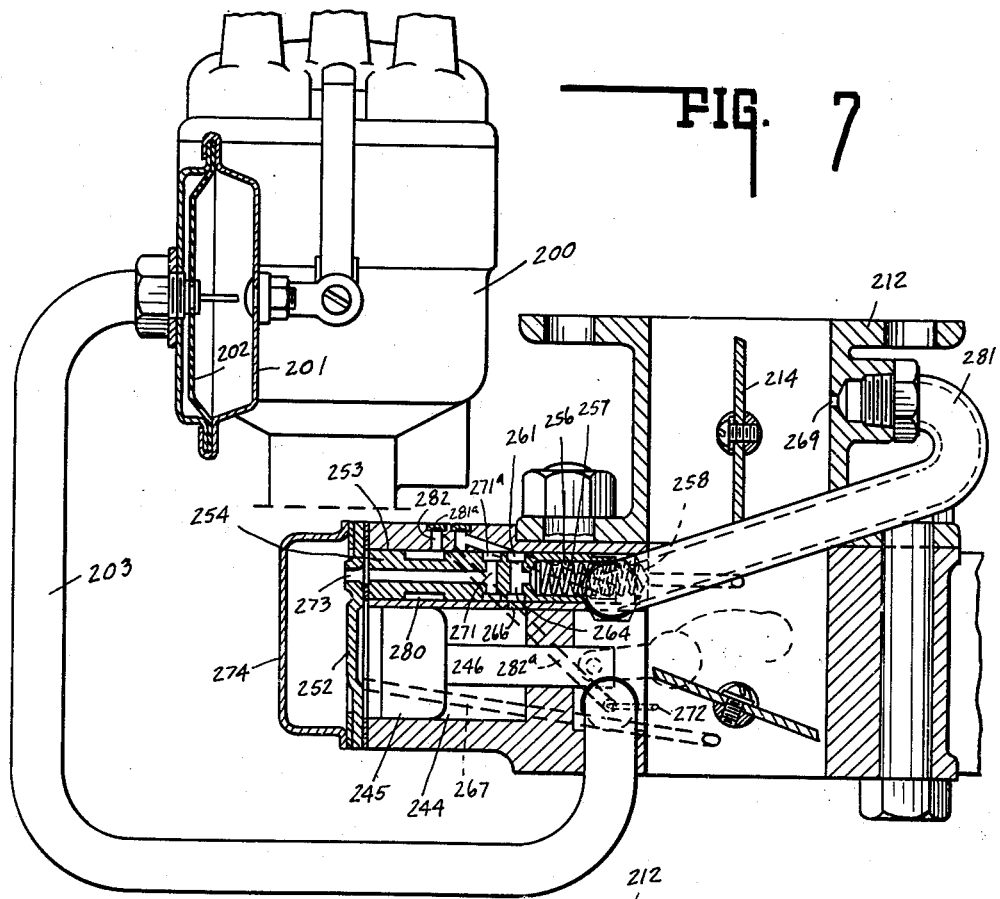
INVENTOR.
RAYMOND HUFFORD.
BY Lockwood, Goldsmith & Galt.
ATTORNEYS.

Patented Aug. 24, 1943

2,327,599

UNITED STATES PATENT OFFICE 2,327,599

ON-CENTER VALVE VACUUM GOVERNOR AND SPARK CONTROL

Raymond Hufford, Anderson, Ind.

Application June 28, 1941, Serial No. 400,239

17 Claims. (Cl. 123—117)

This invention relates to a differential pressure operable governor wherein the governor valve is of butterfly type and is mounted in balanced relation so that the velocity effect thereon of fuel mixture flow is offset or balanced.

This invention also relates to the combination of a differential pressure operable governor of the aforesaid character and an included control for a spark control device.

This application is a continuation-in-part of the copending applications now Patents 2,287,036 dated June 23, 1942, and 2,248,996 dated July 15, 1941.

In both of these copending applications, now patented as noted above, the single butterfly governor valve is illustrated as of the so-called "unbalanced" or "offcenter" type. Herein in contradistinction, the single, butterfly, governor valve is illustrated as of the so-called "balanced" or "on-center" type. Hence, in these applications differential pressures and the velocity of the fuel mixture are the several effective forces involved in the governor whereas in the present invention, the differential pressures only are involved.

As between the present invention disclosure and that of Patent 2,287,036, the governor structure, excluding the valve mounting and force differences mentioned, it is to be noted that the power piston in this application is opposed to the main power spring as distinguished from the power piston in the said last named patent, therein acting in concert with and being additive in effect to the power spring thereof on the control valve.

Substantially the same parts are utilized in both governors, although differently employed, as heretofore stated. The ultimate result, engine governing and spark control is substantially the same.

The chief object of the present invention is to improve the balanced butterfly valve type governor well known in the art—see the expired patent to Jennings No. 1,379,186, and the means for the vacuum control of the engine spark, also broadly well known in the art, in governed internal combustion engines.

In respect to the latter, it is to be noted that governing of an engine, including a vacuum operable spark control, introduces a variable in said control not present in conventional spark controls of ungoverned engines.

The present invention has for one of its objects, the combination and arrangement of parts such that the spark control is automatically and properly effected, regardless of the governing operation, in accordance with engine operation requirements.

One characteristic of the present governor invention is that whereas conventional differential pressure operable governors satisfactorily govern at high speeds, the same at low speeds hunt or surge, the present invention similarly governs at high speeds but also will govern a low speed without said hunting or surging characteristic being materially present. The present invention, therefore, is truly a wide range governor.

Other objects and features of the invention will be set forth more fully hereinafter.

The full nature of the invention will be understood more fully from the accompanying drawings and the following description and claims:

In the drawings, Fig. 1 is a side elevation of a downdraft intake system with the governor interposed therein, the carburetor portion of the system being broken away to show the same and a balanced throttle valve in section, the governor housing cover being removed for clearness.

Fig. 3 is a plan view of another embodiment of the invention without the spark control application, said embodiment being applicable to a Ford-Holley carburetor installation, parts being broken away and parts being shown in section.

Fig. 4 is a view at right angles and of said embodiment with the governor housing cover removed and parts being shown in section.

Fig. 5 is a side elevation of a clutch unit employed with the embodiment illustrated in Figs. 3 and 4.

Fig. 6 is a face view of a portion of such unit.

Fig. 7 is a side elevational view of a spark control and control device therefor together with the control for the last mentioned control and the governor, carburetor and governor portions being shown in section, the piston valve being shown in the normal engine running position so far as spark control is concerned.

Fig. 8 is a similar view of the structure shown in Fig. 7 but with the piston valve in the spark controlling position.

Figure 1:
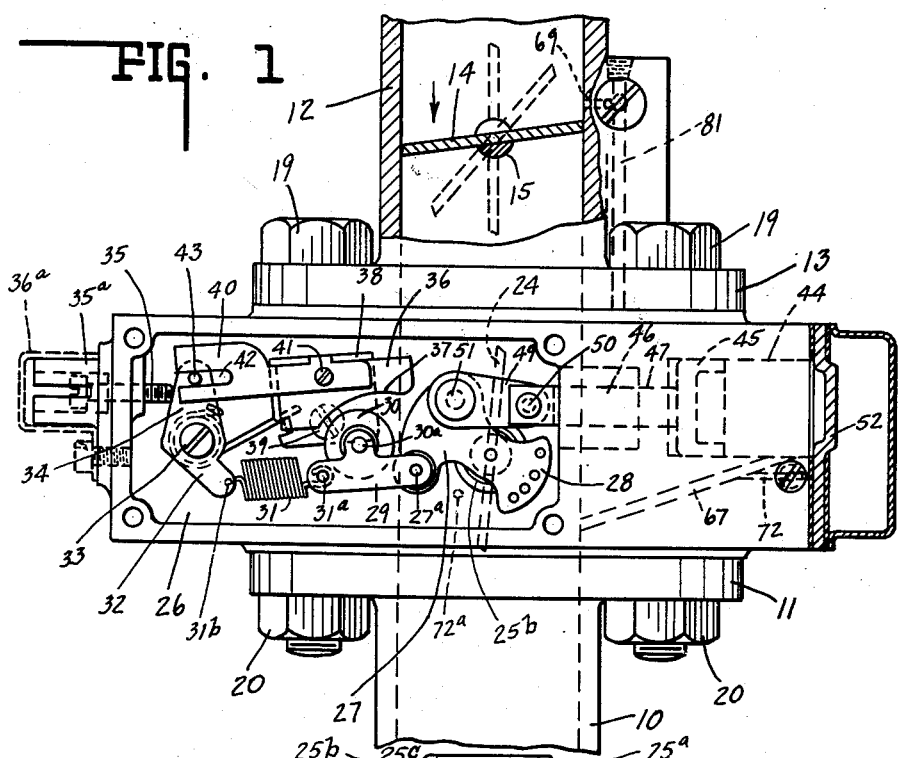

In Fig. 1 there is illustrated a portion of a downdraft intake system of an internal combustion engine and the numeral 10 indicates the engine intake manifold having coupling flange 11. A carburetor 12 includes a coupling flange 13 and in the intake passage thereof is a conventional "on-center" or "balanced" butterfly type throttle valve 14 supported by shaft 15 and responsive to manual control and operation in the well known manner.

Figure 2:
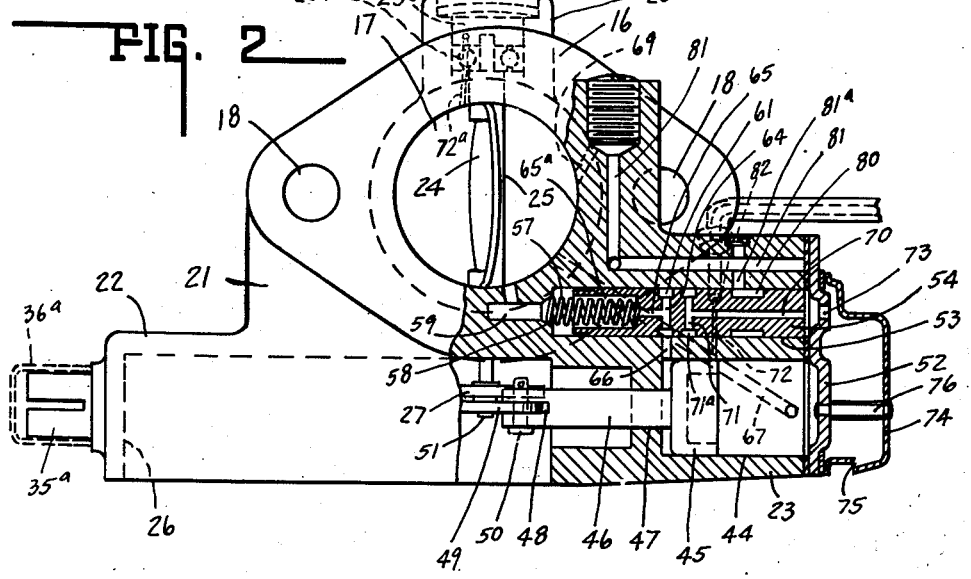
Fig. 2 is a top plan view of the insert type governor embodying the invention, parts being broken away to illustrate in section and plan, certain of the parts and with greater clearness.

The governor includes body portion 16 with intake and bolt passages 17 and 18, respectively, therethrough—see Fig. 2. Bolts 19 and nuts 20 suitably connect the carburetor, governor and intake manifold together and therebetween is included the necessary and usual gaskets, not illustrated.

The governor body 16 is enlarged laterally as at 21—see Fig. 2—and is further enlarged transversely thereof as indicated at 22 and 23. In the passage 17 is a "balanced" or "on-center" butterfly type governor valve 24 carried by shaft 25, one end of which extends into the mechanism chamber 26. In said chamber is a combination arm 27 and counterweight 28, same being rigidly secured to said shaft 25. The arm may be said to be T-shaped and at one end there is pivotally connected thereto at 27a one end of a T-shaped link structure 29.

Since the arm 27 has arcuate angular movement, the link connection thereto has an amount of linear movement corresponding to a function of the angle of movement.

The T-shaped link structure 29 is of dual character and the intermediate end pivotally supports roller 30 at 30a. The third end is connected at 31a to one end of "load" spring 31 which normally constrains valve 24 to open valve position. The other end of spring 31 is connected at 31b to an arm or plate 32 pivotally mounted at 33 and having extension 34. An externally adjustable screw 35 in internally threaded boss 35a bears against extension 34 so that when pivot screw 33 is tightened down sufficiently, the position of the plate 32 is adjusted by means of member 35 for adjusting the force of spring 31 to be overcome in the closing movement of the valve. A cap 36a may telescope said boss 35a and be secured and sealed to the structure in the conventional manner.

The normal force of this spring relative to its elongation is substantially a straight line function. The force effective on the valve operating means (hereinafter to be described) for different valve positions is, however, comparable to the vacuum curve of an engine.

The present invention, therefore, includes means for modifying the straight line function of the opposing spring to correspond to the vacuum curve and the function of the angle of the valve arm movement. Herein such means includes the roller 30 before mentioned, which engages a relatively stationary member 36 by bearing on the substantially sinusoidal surface 37 thereof.

Member 36 is carried by the angular base member 38 pivoted at 39 to a wall of the governor chamber 26. An arm 40 is secured at 41 to member 36 and base 38. Connection 41 simultaneously secures base 38, arm 40 and member 36 together. These three members may be formed integral if desired and would be so formed for commercial production runs of reasonable volume for single model use.

Arm 40 includes slot 42 and therein is seated a pin 43 carried by the extension 34 of plate 32. When member 35 is adjusted, the position of surface 37 and spring force is simultaneously adjusted.

Herein the power for moving the valve toward closed position is differential pressure. This is applied to a piston. A diaphragm structure might serve, in certain instances, equally as well.

In the governor body portion 23 is a cylinder bore 44 in which is mounted piston 45 to which is connected a stem or rod 46 slidable in bearing 47 and slotted at its free end as at 48 for pivotal connection at 50 to the link 49 in turn connected at 51 to the valve lever member 27.

The cylinder 44 is closed by a head 52. The head closed end of the cylinder communicates at all times by passage 67—see Fig. 1—with the intake 10—17 and hence, downstream of the throttle and governor valves 14 and 24, respectively, so that piston 45 is always subject to engine or intake suction.

Line or passage 67 includes a branch 72—see Fig. 1—that leads to the vacuum line of a spark control device of which there are many types available. This branch 72 for example, could connect to fixture 53 in Arthur No. 1,873,174 instead of line 60 thereof, or fixture 58 in Arthur No. 2,107,266 instead of line 61 thereof, or line 11 of Nickerson No. 1,139,707 provided each of the patented spark control structures is properly adjusted for cooperative operation with branch 72 et cetera herein. The aforesaid references are given only by way of illustration and not in any limitational sense. This branch 72 accordingly constantly applies in restricted form manifold suction to the control for the spark control device.

Whenever this suction pressure is modified, the control for the spark control device will be operated for spark adjustment, substantially as described in the copending spark control application mentioned hereinbefore.

In Fig. 2 herein there is illustrated a bore 53 in which is mounted a piston valve 54. A port or passage 66 connects the stem end of the cylinder 44 to said bore 53. Bore 53 is reduced at 59 and such portion 59 communicates with the intake 17 upstream of the governor valve 24 therein and downstream of the carburetor valve 14.

Piston valve 54 has an annular groove 61 intermediate its ends and a cross bore 64 communicates at opposite ends therewith and with a coaxial passage 65. This is enlarged at 65a and a light spring 57 is seated in this enlargement and bears at 58 on the end of cylinder bore 53 adjacent the passage 59. Sufficient suction on passage 59 will move piston valve 54 to the left to seal passage 66 to power cylinder 44. When the pressures on the piston valve balance, the suction (pressure) in the intake between the valves 14 and 24 is applied to the rod face of the power piston 45. As illustrated, piston 45 in the cylinder 44 is subject through passage 67, at all times, to the unrestricted pressure in the intake downstream of valve 24 or manifold suction.

Spring 31, when not collapsed, exerts an opposing force on piston 44 in the same direction as the upstream suction applied through passages 59 and 66 when in communication.

The piston valve 54 in Fig. 2 includes an oppositely directed independent passage 70 communicating with a cross bore 71 in turn communicating with the external groove 71a in the piston valve, which groove is adjacent groove 61. The head 52 is apertured at 73 to apply atmospheric pressure to the piston valve. A guard 74 may be provided, same having port 75 and being secured to the head 52 at 76.

The piston valve when sucked to the left of that shown in Fig. 2 registers groove 71a with port 66 and hence, applies atmospheric pressure to the rod face of power piston 45 which assists the suction applied by passage 67 to the opposite face thereof to move the power piston 45 to the right against spring 31 extension.

From the foregoing, it is apparent that the piston valve is always subject to atmospheric or subatmospheric pressure at one end and is balanced by the light spring 57. The power piston 45 always is subject to the tension of the power spring 31, or springs (unless collapsed) at one side and always is subject to engine suction (downstream pressure) on the opposite side.

The power piston will be subject to one of the following determinable by the piston valve position and other conditions, to-wit:

1. When both carburetor (throttle) and governor valves are wide open, the pressures on opposite sides of the power piston are approximately the same although at very high speeds, due to the valve functioning, there may be a slight difference. The power piston moves to the left.

2. When the governor valve is closed and the carburetor intake pressure is applied to one end of the power piston substantially atmospheric or sub-atmospheric pressure will be applied to the rod end of the power piston when the piston valve is to the right.

3. If the piston valve is to the left, due to engine suction, and with the carburetor throttle valve closed and the governor throttle valve being closed, following the hand throttle, the atmospheric-spring balance on the piston valve is controlled and the power piston will move to the right.

If desired, a supplemental spring may be connected at one end to arm 32 and at the other end to pivot 50, pivot 51 or pivot 27a. Also such a spring could be connected at one end to any one of the aforesaid connections and at its opposite end to the wall of chamber 26 et cetera. A dual spring disclosure slightly different from the aforesaid is illustrated in Figs. 3 and 4 to which reference will be had hereinafter.

With both carburetor and governor valves wide open, suction is applied to one side of the piston valve and atmospheric pressure to the other, and at the same time, the valve being in balance, suction is applied to both sides of the power piston as described.

For spark control, the piston valve includes an annular channel 80. A passage 81 communicates with the carburetor intake 12 upstream of the closed position of valve 14 as at 69—see Fig. 1.

A port 82 adjacent port 81a leads to the line 72—see Fig. 2—and is in free communication therewith. This port 82 is so placed that when the piston valve is to the right in Fig. 2 it does not apply sub-atmospheric pressure to the spark control because at this time the wide groove 80 in the piston valve 54 does not connect ports 82 and 81a. When, however, the piston valve is moved to the left, atmospheric pressure from passage 70 is applied at 66 to the power piston 45 to assist vacuum from line 67 to move the power piston 45 to the right. Simultaneously, the wide groove 80 in the piston valve 54 connects the sub-atmospheric port 81a to port 82 so that sub-atmospheric pressure from port 69 and passage 81 is applied to the spark control device. This application is not of restricted character whereas the manifold suction through passage 72 is of restricted character, as aforesaid.

As set forth in the copending spark control application, this pressure application overcomes the restricted constant application; hence, the spark control device is properly actuated in accordance with engine governing and operation.

This occurs when the carburetor valve 14 is closed and the governor valve 24 is open or when both valves are closed. When both valves are open, the spark control is not disturbed. When the carburetor valve 14 is wide open and the governor valve 24 is closed, the spark control is not disturbed.

In Fig. 2 there is illustrated a boss 25a in which is mounted an anti-friction unit 25b mounting shaft 25 similar to anti-friction unit 25b shown in Fig. 1 at the control end of the shaft 25 in chamber 26. A passage 72a leads from the governor intake 17 downstream of the governor valve 24 to the back end of closed chamber 25c mounting the other end of shaft 25. The purpose of this passage 72a is to provide substantially the same pressure in chamber 25c as is present in chamber 26. This is important because it eliminates the tendency of the shaft 25 to pull toward the main body portion of the governor. This arrangement insures proper valve operation. Other forms of the invention are similarly constructed but are not so illustrated herein for clearness.

Reference now will be had to Figs. 7 and 8 wherein a slightly modified form of spark control is illustrated. Herein, numerals of the 200 series indicate parts comparable to parts shown in Figs. 1 and 2 designated by primary numerals.

In Figs. 7 and 8, the numeral 200 indicates a spark control device and 201 a control therefor, including a diaphragm 202 responsive to suction applied by line 203. This line is in constant but restricted communication by small passage 272 with the engine manifold downstream of all valves. Passage 267 is in constant and free communication with the engine manifold for intake suction application to the rear end of cylinder 244 and hence, the back face of power piston 245. This form differs in that line 282a from port 282 connects to conduit 203 with passage 272. Hence, when the piston valve registers the crossbore 264 with port 266—see Fig. 7—vacuum is applied to port 282 and wide groove 280 by line 282a but such vacuum is there stopped. When the piston—see Fig. 8—is moved to register the atmospheric pressure applying channel or groove 272 by port 271a with port 266 sub-atmospheric pressure in passage 281 then is applied through port 281a to the groove 280, port 282 and passage 282a and from same to conduit 203.

Hence, in this form of the invention as well as that in Figs. 1 and 2, the port 282 is alternately subjected to vacuum or sub-atmospheric pressure but in this form the wide groove in the piston valve is subject alternately to both while in Figs. 1 and 2 said groove is only subject to sub-atmospheric pressure.

One commercial embodiment of this invention is illustrated in Figs. 3 and 4. This is associated with a Holley carburetor and the governor throttle body is substituted for and replaces the throttle body of the standard Ford-Holley carburetor. Spark control is absent.

The method of installation on a Ford V–8 engine briefly is as follows: The usual air cleaner is first removed from the Holley carburetor. The gasoline line and hand throttle are disconnected at the carburetor. The accelerator rod and choke also are disconnected therefrom. These are on the left and right sides of the carburetor, respectively. The connecting link between the foot throttle lever and pump rod is then detached. The hand throttle lever is detached together with its spring and lever retainer. The carburetor and throttle body then are separated. The governor throttle body 109 shown in Fig. 3 is substituted for the standard throttle body. The spring, throttle lever and lever retainer are then connected to the governor valve shaft 110. The other foregoing operations, in reverse order complete the assembly and installation of the governor and air cleaner. Following adjustment for the desired speed, the governor may be sealed with the conventional wire and lead seal, not shown, as is well understood in the governor art.

Throttle body 109 includes two passages 108 controlled by the balanced or on-center butterfly valves 107 mounted on valve shaft 110. Passage 106 connects both passages 108 for equalization, et cetera, and communicates with chamber 105. Rigid with throttle body 109 is the governor proper body portion 111 and connecting same is a web arrangement 112 of appreciable thickness.

Governor body 111 at one end includes a cylinder formation 113 closed by head 114. Passage 115 connects the head closed end of the cylinder 113 to chamber 105 so that the head closed end of the cylinder and the piston therein is subject to the intake pressure on the engine side of the butterfly valves 107.

In this cylinder 113 is a tubular piston 116. Within the same and secured by flanges 117 and 118 is a cup-like member 119 that mounts at 120 the piston nested stem portion 121. A pair of links 122 is pivoted at 123 to this piston stem portion 121. These links have a curved portion 124, see Fig. 4, for clearance purposes.

The governor throtttle body portion 111 includes a chamber 125 closed by a gasket and plate, not shown, but secured thereto at 126. The shaft 110 is squared at 127. Rigid therewith are the spaced valve shaft operating lever arms 128. One of these arms is straddled by the spaced connecting rod members 122—124 pivotally connected thereto at 131. If desired, a position maintaining spring 129, enveloping shaft 110, may be provided.

A pair of T-shaped links 132 straddle the other arm 128 and at one end are pivotally connected thereto at 133. Pivots 131 and 133 are coaxial at all times. The middle arm portions 132a of the spaced links pivotally support a roller 135 at 134. The other ends of said links are connected by pin 136.

A governor spring 137 has one end 138 hook-shaped to embrace pin 136. A primary or smaller spring 139 within the governor spring has one end 140 hook-shaped to embrace pin 136 at one side of the end 138. A plate 141 is pivoted on the locating boss 142 by bolt 143. A spring 144 is coiled about the boss and has one end 145 bearing on the wall of chamber 125 and the other end 146 is U-shaped and engages said plate member 141.

This plate 141 has an elongated slot 147 therein and in alignment therewith is a hole 148. The other and hook-shaped end 149 of the governor spring 137 is seated in slot 147. The other and hook-shaped end 150 of the primary spring 139 is seated in hole 148.

Projecting from the housing is the internally threaded boss 151 that mounts the threaded adjusting stop 152 which is contacted by plate 141 constrained to such engagement by spring 144.

Plate 141 mounts pin 153 that is seated in a slot 154 in the sine surface providing structure including slotted member 155 secured at 156 to an angle structure 157 having the sinusoidal surface 158 contacted by roller 135. Angle member 157 is secured in the chamber 125 at 160 and to the adjacent wall thereof.

From the foregoing description it will be noted that plate 141 is adjusted in tilted relation by the adjustable member 152 and thereby the tension of the two springs can be adjusted as desired and simultaneously therewith the position of surface 158 is adjusted. The shape of this surface has a predetermined relationship to the forces of the springs and modifies same.

Suction from chamber 105 applied to the piston structure 116 et cetera, moves the valve shaft 110 through rods 122—124 and the arm 128 in opposition to spring extension, the spring forces being controlled or modified, after initial adjustment, by the roller and sinusoidal surface contact.

A vent duct or passage 125a opens at one end into chamber 125, see Fig. 4, and at its opposite end is connected, see Fig. 3, so as to be subject to the intake pressure on the carburetor side of the butterfly governor valves 107. Hence, piston 116, et cetera, is subject to differential pressure whenever the pressures on opposite sides of the valves 107 differ. Thus, as the valves are moved, the pressures do vary or differ; hence, the differential pressure forces on the piston vary for different positions of the valves. Also, as the load and speed varies these pressures vary.

It will be observed that the end 149 of the governor spring 137 slides in slot 147. This, when adjusted, for instance, at low speed, does not permit the governor spring to come into action until the governor is partially closed. The higher value for which the spring is adjusted, the sooner this spring will come into action. The curvature 124 in rods 122 is solely for clearance convenience.

Each end of the valve shaft is provided with a suitable clutch assembly—see Figs. 5 and 6—and this is so constructed that possible relative travel between the clutch members equals the travel of the butterfly valves 107 between wide open and completely closed positions.

Herein clutch member 161 has two arcuately spaced similarly directed portions 162. The (valve) shaft mounts same. The throttle shaft 163 mounts plate 164 having the oppositely directed portions 165. Portions 165 and 162 are interfitted with the travel specified possible therebetween. This is indicated by arrow 166, see Fig. 6. The operation of this Ford-Holley carburetor application governor embodiment is substantially the same as that previously described for the first described embodiment of the invention.

In Fig. 3 the lower end of shaft 110 is shown clutch connected to the arm A carried by lower shaft 163. Arm A is adapted for connection to the conventional foot accelerator pedal operated rod that goes to the carburetor and known as the throttle rod. The upper end of the shaft 110 is similarly clutch equipped and adapted for connection to a similar arm, in turn similarly connectible to the usual hand throttle operable rod if utilized. Present Ford structures omit this latter throttle control. When the foot accelerator is "held down" in wide open position, the lower clutch members (see Fig. 3) are held apart and speed is under governor control. When the accelerator is released, the throttle return spring on the eccelerator (both not shown) causes clutch member lug 165 to contact clutch member lug 162. The throttle return spring is sufficiently strong to overcome the governor spring and retard the engine speed to curb idle.

It will be observed this commercial form of the invention does not contemplate the inclusion of a control for a spark control device but the same may be incorporated with this governor either as illustrated in the first embodiment of the invention or as shown (an attachment) in the copending allowed spark control application referred to initially herein.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. The combination of a suction passage and a spark device control connected at one end to a spark device and having its opposite end constantly but restrictively subject to the suction in said passage, a pressure actuated governor valve of balanced butterfly type in said passage, a valve shaft, a piston connected to the valve and subject to differential pressure, spring means normally constraining the valve to open position, means modifying the force of said spring means in the extension thereof for the purpose described, a conduit adapted to apply pressure to said control in excess of the constantly applied restrictive suction thereto, and pressure operable valve means simultaneously controlling the first mentioned piston and the conduit.

2. The combination of a suction passage and a spark device control connected at one end to a spark device and having its opposite end constantly but restrictively subject to the suction in said passage, a pressure actuated governor valve of butterfly type in said passage, a valve shaft, a piston connected to the valve and subject to differential pressure, spring means normally constraining the valve to open position, means modifying the force of said spring means in the extension thereof for the purpose described, a conduit adapted to apply pressure to said control in excess of the constantly applied restrictive suction thereto, and pressure operable valve means simultaneously controlling the first mentioned piston and the conduit.

3. An arrangement as defined by claim 1, characterized by the valve means being of piston character.

4. An arrangement as defined by claim 2, characterized by the valve means being of piston character.

5. An arrangement as defined by claim 2, characterized by spring modifying means including a sinusoidal type surface and a member movable with the spring means engaging same in spring means extension.

6. An arrangement as defined by claim 2, characterized by spring modifying means including a sinusoidal type surface and a member movable with the spring means engaging same in spring means extension, and means simultaneously adjusting the spring means initial tension and the sinusoidal surface position.

7. An arrangement as defined by claim 2, characterized by spring modifying means including a sinusoidal type surface and a member movable with the spring means engaging same in spring means extension, means simultaneously adjusting the spring means initial tension and the sinusoidal surface position, said last mentioned means including a member for connection to one end of the spring means and tiltable for adjustment, and means for tilting the member, said spring modifying means including a member provided with said sinusoidal surface, said members having a pin and slot connection therebetween.

8. In a suction operated governor having a suction passage, a balanced butterfly governor valve, a shaft therefor, an external arm rigid therewith, a power piston constantly subject to passage suction downstream of the valve, link means connected directly at opposite ends to the arm and piston, spring means connected to said arm and normally constraining the valve to open valve position, and means for modifying the force of said spring means to substantially conform to a predetermined engine vacuum curve, said piston also being subject to intake pressure upstream of the governor valve.

9. In a suction operated governor having a suction passage, a balanced butterfly type governor valve, spring means normally constraining the governor valve to open valve position, differential pressure operable means normally subject to passage suction at all times and connected to the valve for closing same in opposition to the spring means and selectively subject to intake pressure upstream of the governor valve, and means modifying the force of said spring means to substantially conform to a predetermined engine vacuum curve.

10. In a suction operated governor having a suction passage, a balanced butterfly type governor valve, and a spring means normally constraining the governor valve to open valve position, differential pressure operable means normally subject to passage suction at all times and connected to the valve for closing same in opposition to the spring means and selectively subject to intake pressure upstream of the governor valve, and means modifying the force of said spring means to substantially conform to a predetermined vacuum curve, and spring modifying means including a sinusoidal type surface and a member movable with the spring means engaging same in spring means extension.

11. In a suction operated governor having a suction passage, a balanced butterfly type governor valve, and a spring means normally constraining the governor valve to open valve position, differential pressure operable means normally subject to passage suction at all times and connected to the valve for closing same in opposition to the spring means and selectively subject to intake pressure upstream of the governor valve, and means modifying the force of said spring means to substantially conform to a predetermined vacuum curve, and spring modifying means including a sinusoidal type surface and a member movable with the spring means engaging same in spring means extension, and means simultaneously adjusting the spring means initial tension and the sinusoidal surface position.

12. In a suction operated governor having a suction passage, a balanced butterfly type governor valve, and a spring means normally constraining the governor valve to open valve position, differential pressure operable means normally subject to passage suction at all times and connected to the valve for closing same in opposition to the spring means and selectively subject to intake pressure upstream of the governor valve, and means modifying the force of said spring means to substantially conform to a predetermined vacuum curve, and spring modifying means including a sinusoidal type surface and a member movable with the spring means engaging same in spring means extension, means simultaneously adjusting the spring means initial tension and the sinusoidal surface position, said last mentioned means including a member for connection to one end of the spring means and tiltable for adjustment, and means for tilting the member, said spring modifying means including a member provided with said sinusoidal surface, said members having a pin and slot connection therebetween.

13. In a suction operated governor having a suction passage, a balanced butterfly type governor valve, and a spring means normally constraining the governor valve to open valve position, differential pressure operable means normally subject to passage suction at all times and connected to the valve for closing same in opposition to the spring means and selectively subject to intake pressure upstream of the governor valve, and means modifying the force of said spring means to substantially conform to a predetermined vacuum curve, and spring modifying means including a sinusoidal type surface and a member movable with the spring means engaging same in spring means extension, the spring means being of dual character, and one being initially ineffective for constraint purposes in the initial closing movement of the governor valve.

14. In a suction operated governor having a suction passage, a balanced butterfly type governor valve, and a spring means normally constraining the governor valve to open valve position, differential pressure operable means normally subject to passage suction at all times and connected to the valve for closing same in opposition to the spring means and selectively subject to intake pressure upstream of the governor valve, and means modifying the force of said spring means to substantially conform to a predetermined vacuum curve, and spring modifying means including a sinusoidal type surface and a member movable with the spring means engaging same in spring means extension, and means simultaneously adjusting the spring means initial tension and the sinusoidal surface position, the spring means being of dual character, and one being initially ineffective for constraint purposes in the initial closing movement of the governor valve.

15. In a suction operated governor having a suction passage, a balanced butterfly type governor valve, and a spring means normally constraining the governor valve to open valve position, differential pressure operable means normally subject to passage suction at all times and connected to the valve for closing same in opposition to the spring means and selectively subject to intake pressure upstream of the governor valve, and means modifying the force of said spring means to substantially conform to a predetermined vacuum curve, and spring modifying means including a sinusoidal type surface and a member movable with the spring means engaging same in spring means extension, means simultaneously adjusting the spring means initial tension and the sinusoidal surface position, said last mentioned means including a member for connection to one end of the spring means and tiltable for adjustment, and means for tilting the member, said spring modifying means including a member provided with said sinusoidal surface, said members having a pin and slot connection therebetween, the spring means being of dual character, and one being initially ineffective for constraint purposes in the initial closing movement of the governor valve.

16. In a suction governor having a suction passage, a balanced butterfly type governor valve in the passage, spring means normally constraining the governor valve to open valve position, differential pressure operable means normally subject to passage suction downstream of the valve and at all times and connected to the governor valve for closing same in opposition to the spring means and selectively subject to passage pressure upstream of the governor valve, and means modifying the force of said spring means to substantially conform said force to a predetermined engine vacuum curve, the spring means being of dual character and one within the other, the modifying means including a sinusoidal surface conformingly effective upon the force of the spring means upon extension thereof, said sinusoidal surfaced means having a pin and slot connection with a member tiltable for surface position adjustment, each of the springs having an end secured to said member for simultaneous spring force adjustment purposes, one spring having an end relatively fixed to said member and the other riding in an elongated slot in said member, the projected longitudinal direction of the slot including the fixed spring anchorage.

17. In a suction governor having a suction passage, a balanced butterfly type governor valve in the passage, spring means normally constraining the governor valve to open valve position, differential pressure operable means normally subject to passage suction downstream of the valve and at all times and connected to the governor valve for closing same in opposition to the spring means and selectively subject to passage pressure upstream of the governor valve, means modifying the force of said spring means to substantially conform said force to a predetermined engine vacuum curve, the spring means being of dual character and one within the other, the modifying means including a sinusoidal surface conformingly effective upon the force of the spring means upon extension thereof, said sinusoidal surfaced means having a pin and slot connection with a member tiltable for surface position adjustment, each of the springs having an end secured to said member for simultaneous spring force adjustment purposes, one spring having an end relatively fixed to said member and the other riding in an elongated slot in said member, the projected longitudinal direction of the slot including the fixed spring anchorage, other spring means constraining said tiltable member toward one position, and adjustable means engaged by the tiltable member when under the last mentioned spring means constraint for maintaining said tiltable member in the desired adjusted tilted position.

RAYMOND HUFFORD.